US012758906B2

(12) United States Patent
Muske et al.

(10) Patent No.: US 12,758,906 B2
(45) Date of Patent: Oct. 13, 2026

(54) SYSTEMS AND METHODS FOR FILTER AND/OR DEBRIS DISPOSAL FOR AN EXTRACTION SYSTEM FILTER

(71) Applicant: ILLINOIS TOOL WORKS INC., Glenview, IL (US)

(72) Inventors: Mitchell James Muske, Neenah, WI (US); Allan T. Hilbert, Appleton, WI (US); Jeremy Bruesewitz, Appleton, WI (US); William Gardner, Appleton, WI (US); Joseph C. Schneider, Greenville, WI (US)

(73) Assignee: ILLINOIS TOOL WORKS INC.

( * ) Notice: Subject to any disclaimer, the term of this patent is extended or adjusted under 35 U.S.C. 154(b) by 764 days.

(21) Appl. No.: 17/668,806

(22) Filed: Feb. 10, 2022

(65) Prior Publication Data

US 2022/0258086 A1 Aug. 18, 2022

Related U.S. Application Data

(60) Provisional application No. 63/149,870, filed on Feb. 16, 2021.

(51) Int. Cl.
*B01D 46/00* (2022.01)
*B01D 46/42* (2006.01)
(Continued)

(52) U.S. Cl.
CPC ..... *B01D 46/0004* (2013.01); *B01D 46/0005* (2013.01); *B01D 46/0015* (2013.01);
(Continued)

(58) Field of Classification Search
CPC ........ B01D 45/00; B01D 45/02; B01D 45/18; B01D 46/00; B01D 46/0002; B01D 46/0004; B01D 46/0005; B01D 46/0009; B01D 46/0015; B01D 46/42; B01D 46/4227; B01D 46/48; B01D 46/88; B01D 46/90; B01D 2201/30; B01D 2201/314;
(Continued)

(56) References Cited

U.S. PATENT DOCUMENTS 4,124,361 A 11/1978 Revell
4,193,844 A * 3/1980 Neumann .......... B01D 46/0094 55/504
(Continued)

FOREIGN PATENT DOCUMENTS

DE 102012013287 1/2014
DE 102018008122 4/2020
(Continued)

OTHER PUBLICATIONS

Canadian Office Action Appln No. 3,148,951 dated Aug. 15, 2024.
(Continued)

*Primary Examiner* — Allison G Fitzsimmons
(74) *Attorney, Agent, or Firm* — MCANDREWS HELD & MALLOY

(57) ABSTRACT

The disclosed filter and/or debris disposal system is configured to easily dispose of filter elements, filter media, and/or debris with minimal resources, and/or effort. In some examples, a flexible container is employed to enclose a used filter element prior to removal of the filter from the extractor.

12 Claims, 11 Drawing Sheets

(51) Int. Cl.
*B01D 46/88* (2022.01)
*B01D 45/00* (2006.01)

(52) U.S. Cl.
CPC ......... *B01D 46/0091* (2013.01); *B01D 46/42* (2013.01); *B01D 46/4227* (2013.01); *B01D 46/88* (2022.01)

(58) Field of Classification Search
CPC ........ B01D 2201/307; B01D 2201/308; B01D 2321/00
USPC ... 95/45, 273, 274, 277, 278, 279, 280, 282; 55/282, 304, 305, 361, 490, 492, 494, 55/493, 495, 529
See application file for complete search history.

(56) References Cited

U.S. PATENT DOCUMENTS

| | | | | |
|---|---|---|---|---|
| 4,521,234 A * | 6/1985 | Peebles, Jr. | B01D 46/4227 55/502 |
| 11,376,538 B2 * | 7/2022 | Wilkins | B01D 46/0004 |

FOREIGN PATENT DOCUMENTS

| | | |
|---|---|---|
| EP | 0846488 | 6/1998 |
| EP | 0976438 | 2/2000 |
| EP | 3093059 | 11/2016 |
| EP | 4043086 | 8/2022 |
| FR | 2338735 | 8/1977 |
| SE | 353020 | 1/1973 |

OTHER PUBLICATIONS

European Office Communication with extended search report Appln No. 24223089.4 dated Mar. 5, 2025.
European Office Communication Appln No. 22157084.9 dated Aug. 23, 2022.
European Office Communication with extended European Search Report Appln No. 22157084.9 dated Jun. 27, 2022.
European Office Communication Appln No. 22157084.9 dated Jul. 21, 2023.
Canadian Office Action Appln No. 3,148,951 dated Sep. 28, 2023.

* cited by examiner

SYSTEMS AND METHODS FOR FILTER AND/OR DEBRIS DISPOSAL FOR AN EXTRACTION SYSTEM FILTER

CROSS-REFERENCE TO RELATED APPLICATIONS

This application hereby claims priority to and the benefit of U.S. Provisional Application Ser. No. 63/149,870, entitled "Systems And Methods For Filter And/Or Debris Disposal For An Extraction System Filter," filed Feb. 16, 2021. U.S. Provisional Application Ser. No. 63/149,870 is hereby incorporated by reference in its entireties for all purposes.

BACKGROUND

A wide range of industrial, commercial, hobby and other applications result in airborne components that can be removed with proper extraction and filtering. Metal working operations, for example, range from cutting, welding, soldering, assembly, and other processes that may generate smoke and fumes. In smaller shops it may be convenient simply to open ambient air passages or to use suction or discharge air from fans to maintain air spaces relatively clear. In other applications, enclosed and/or cart-type fume extraction systems are used. In industrial settings, more complex fixed systems may be employed for extracting fumes from specific works cells, metal working locations, and so forth. In other settings, such as machine shops, woodworking shops, worksites where cutting, sanding and other operations are performed, dust, fumes, particulate and other types of airborne components may be generated that it may be desirable to collect and extract from work areas and controlled spaces.

A number of systems have been developed for fume extraction, and a certain number of these are currently in use. In general, these use suction air to draw fumes and smoke from the immediate vicinity of the metal working operation, and to filter the fumes and smoke before returning the air to the room or blowing the air to an outside space.

Further improvements are needed, however, in fume extraction systems. For example, it would be useful to be able to clean and/or remove filter elements in such systems, thereby extending the useful life of the filter and/or extraction system, and/or improving performance of the extraction system.

SUMMARY

The present disclosure provides improvements to airborne extractors designed. The disclosed filter and/or debris disposal system is configured to easily dispose of filter elements, filter media, and/or debris with minimal resources, and/or effort. These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1:
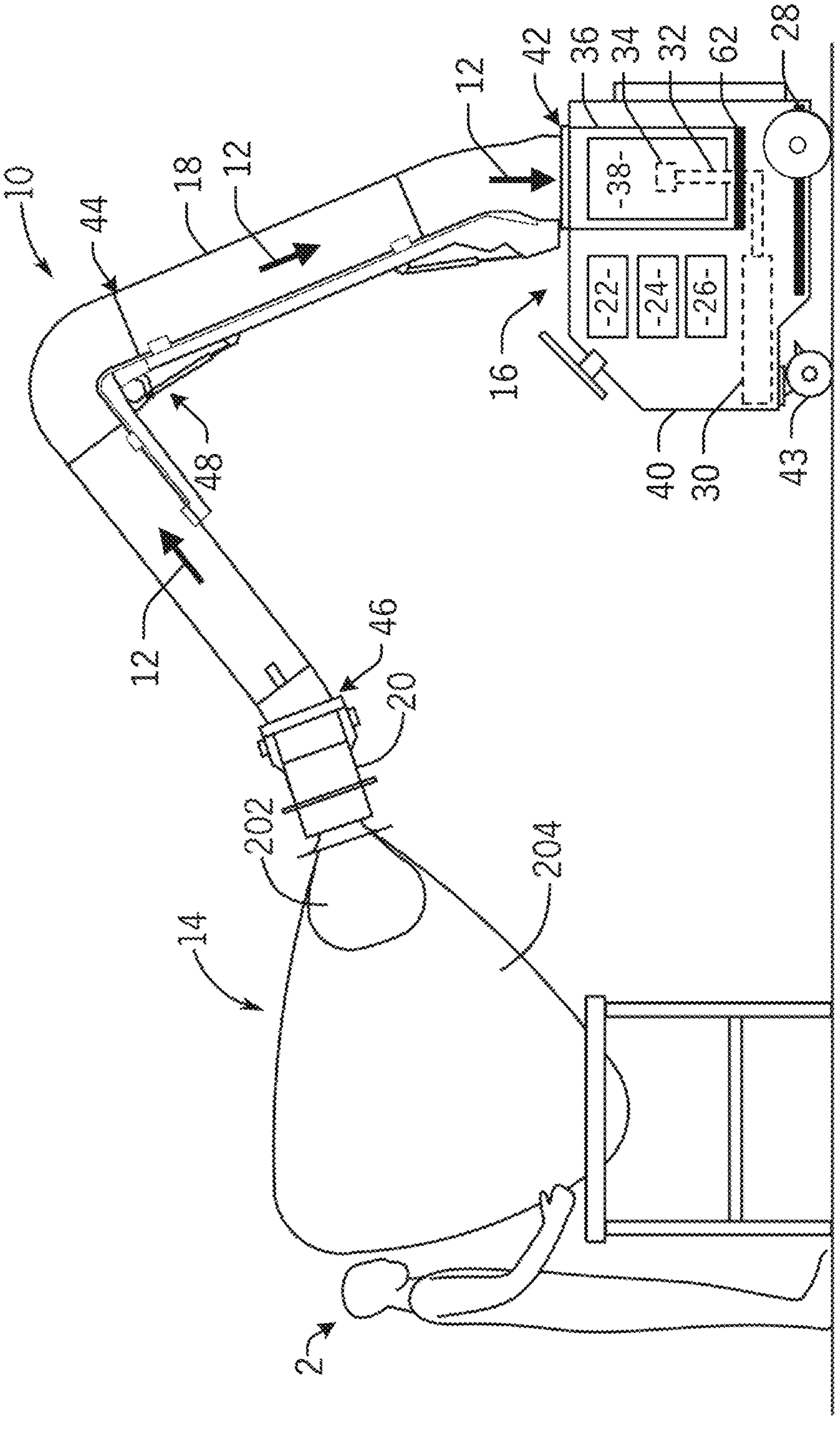
FIG. 1 illustrates an example fume extractor that includes a filter removal system, in accordance with aspects of this disclosure.

Disclosed are systems and methods for filter disposal for use in an airborne extractor system. In some examples, a flexible container is employed to enclose a used filter element prior to removal of the filter from the extractor. In some examples, a removable tray is arranged to collect debris below a filter element, the tray being accessible for removal (e.g., without removal of the filter element). In some examples, a filter enclosure, filter element, and/or other container includes a removable or partially removable panel configured to open and release debris upon activation of a trigger. In some examples, a flexible container is arranged at an opening of a filter enclosure and configured to be fastened to a filter element prior to removal. As the filter element is removed, the flexible container encloses the filter element as it is removed from the filter enclosure and configured to be sealed prior to disposal. In some examples, a semi-porous flexible container is arranged at an opening of a filter enclosure, a portion of the flexible container being secured to a portion of the opening such that, as the filter element is placed into the filter enclosure, the flexible container expands and/or unrolls to surround the filter element during an airborne extraction operation. In some examples, the flexible container is disposable or reusable.

A filter disposal operation may be partially controlled by a computing platform or control circuitry, such as in response to a monitored condition (e.g., via one or more sensors). Sensor data of the monitored conditions may be used to determine when filter replacement is needed, and provide an alert to an operator.

Advantageously, the disclosed filter disposal system employs a flexible container to enclose a used filter element and/or collected debris, resulting in a more controlled and/or efficient disposal process, thereby improving the efficiency and extending the life of the filter and the system. Thus, the disclosed system provides advantages over conventional systems, which require removal of filter elements with exposed surfaces and/or debris during disposal.

In disclosed examples, a filter disposal system for an airborne extractor system includes a flexible container to enclose a filter element, the flexible container being defined by a first configuration corresponding to an airborne extraction operation and a second configuration corresponding to a disposal operation; and a filter enclosure to house the filter element, wherein the flexible container is arranged between a first portion of the filter element and the filter enclosure in the first configuration and between a second portion of the filter element and the filter enclosure in the second configuration, wherein the second portion is greater than the first portion.

In some examples, the filter enclosure includes an opening to insert the filter element, the flexible container configured to be attached to an end of the filter enclosure opposite the opening in the second configuration. In examples, the flexible container includes one or more fasteners to attach the flexible container to the filter enclosure. In examples, the one or more fasteners include one or more of a magnet, a screw, or a hook.

In some examples, the filter element includes one or more handles, the handles configured to be exposed for removal of the filter element in the second configuration. In examples, the flexible container is configured to allow manipulation of the handles through one or more surfaces of the flexible container to aid in removal of the filter element.

In some examples, the filter enclosure includes an opening to insert the filter element, the flexible container being stored at an end of the filter enclosure opposite the opening in the first configuration.

In some examples, the flexible container is stored in a sealed package configured to be opened at initiation of the disposal operation. In examples, the filter element is configured to be removed through the opening during a disposal operation, the flexible container configured to be removed from the sealed package, and to enclose the filter element as the flexible container is drawn from the end of the filter enclosure toward the opening. In examples, the flexible container further comprises a seal to close the filter element within the flexible container in the second configuration.

In some examples, the filter element comprises a cylindrical element and wherein a blower draws air through a central portion of the cylindrical element.

In some examples, a disposal tray is arranged in the filter enclosure to collect debris from the airborne extraction operation. In examples, the disposal tray is arranged at a base of the filter enclosure, the disposal tray configured to be removed from the filter enclosure to remove debris from the airborne extraction operation.

In some disclosed examples, a debris removal system for an airborne extractor system includes a flexible container to enclose a filter element, the flexible container being defined by a first configuration corresponding to an airborne extraction operation and a second configuration corresponding to a disposal operation; a filter enclosure to house the filter element, wherein the flexible container is arranged between a first portion of the filter element and the filter enclosure in the first configuration and between a second portion of the filter element and the filter enclosure in the second configuration, wherein the second portion is greater than the first portion; and a disposal tray arranged in the filter enclosure to collect debris from the airborne extraction operation.

In some examples, the disposal tray has a handle and is configured to be accessible by an opening in the filter enclosure.

In some examples, the disposal tray is configured to seal in response to removal of the disposal tray from the filter enclosure.

In some examples, the tray comprises a plate-like structure mounted near a bottom region of the filter enclosure.

In some disclosed examples, filter disposal system for an airborne extractor system includes a filter enclosure to house the filter element; a flexible container to enclose a filter element, the flexible container being defined by a first configuration corresponding to an airborne extraction operation and a second configuration corresponding to a disposal operation; and a filter enclosure to house the filter element, wherein the flexible container is arranged between a first portion of the filter element and the filter enclosure in the first configuration and between a second portion of the filter element and the filter enclosure in the second configuration, wherein the second portion is greater than the first portion, wherein the flexible container is configured to expand to enclose the filter element as the filter element is removed from the filter enclosure.

In some examples, the flexible container comprises an air-tight, flexible material.

In some examples, the flexible container is configured to be sealed to enclose the filter element in the second configuration as the filter element is removed from the filter enclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "first" and "second" may be used to enumerate different components or elements of the same type, and do not necessarily imply any particular order.

As used herein the terms "circuits" and "circuitry" refer to any analog and/or digital components, power and/or control elements, such as a microprocessor, digital signal processor (DSP), software, and the like, discrete and/or integrated components, or portions and/or combinations thereof, including physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller.

Turning now to the drawings, FIG. 1 illustrates an extraction system 10 for extracting airborne components, such as smoke, fumes, particulate matter, and more generally, workspace air as indicated by reference numeral 12 from a work area 14. In the illustrated embodiment the extraction system 10 comprises a base unit 16 coupled to conduits 18 that channel air to and from a hood 20. The hood 20 is designed to be placed at or near (e.g., above) the work area 14 and, when the base unit 16 is activated, serves to create region of air around the area and to extract the workspace air, directing extracted air 12 to the base unit 16 for processing.

It should be noted that while in certain embodiments described in the present disclosure a stand-alone base unit 16 or cart-type unit is described, the present disclosure is not limited to any particular physical configuration. More generally, systems and arrangements provided herein may be implemented as fixed or semi-fixed installations, such as those used in industrial, commercial, hobby, and other settings. That is, certain of the components of the base unit described herein may serve multiple workspaces, work cells, weld cells, work locations and areas, and so forth, by common conduits that direct positive-pressure air to and channel air and airborne components from one or more workspaces. Operator controls may be positioned at the work area and/or remotely from such workspaces to control operation of the system 10.

Depending on the application, airborne components evacuated from the work area 14 may be in an aerosol form, such as solid, liquid or gaseous phase particles that are suspended in air. Such airborne components may form smoke, fumes (including chemical fumes), or clouds of components generated by an operation performed in the area. In some applications, the airborne components may be at least temporarily airborne but not suspended in the air, such as in the case of larger particulates, such as droplets, mist (e.g., from oils, coolants, and so forth), dust (e.g., from drywall, grain, minerals, cements, or other dust sources), chips, debris, and so forth. The system 10 is configured to collect and extract any such airborne components. Similarly, reference is made in this disclosure to "air" or "airborne", although the fluid in which the airborne components are found and that is circulated by the system may be, more generally, a gaseous substance that need not contain the same constituents, or in the same ratios as found in atmospheric air. Such gasses are intended nevertheless be included in the term "air" or "airborne". Moreover, it is presently contemplated that the same principles of fluid dynamics and borne component removal may be applied to other "fluids" than air or gasses (including liquids), and to that extent the teachings of the present disclosure are intended to extend to those applications.

In some examples, the base unit 16 includes a blower 22 driven by a drive motor 24. The drive motor 24 (as well as other functions of the extraction system 10) is controlled by control circuitry 26 which may provide drive signals to the motor for fixed-speed or variable-speed operation. The cart may best be designed with a small and highly efficient drive motor on the blower. In some examples, more than one motor and/or blower, fan or compressor may be used. The base unit 16 may be designed to draw power from any source, such as the power grid, battery sources, engine-generator sets, and so forth. The control circuitry 26 typically includes processing circuitry and memory for carrying out drive operations as desired by the operator or in response to system inputs as described below. Accordingly, the control circuitry 26 may communicate with an operator interface for receiving operator settings, speed settings, on-off commands, and so forth. Similarly, the control circuitry 26 may include and/or communicate with an interface (e.g., a remote interface) designed to receive signals from remote inputs, remote systems, sensors, and so forth. The control circuitry 26, via a remote interface, may also provide data to such remote systems such as for monitoring and/or controlling operation of the extraction system 10.

As shown in FIG. 1, the conduits 18 extend between the base unit 16 and the hood 20, which may include a positive pressure air conduit and/or a return air conduit. In some examples, the positive pressure air conduit provides air to the hood, while the return air conduit is under a negative or slight suction pressure to draw air containing the airborne components from the work area 14. The extracted air 12 returning from the hood 20 in conduit 18 may be directed through a filter 38. In some examples, the air 12 may be re-introduced into the blower 22 as a semi-controlled system. As described herein, the system may also include components designed to allow for adjustment of the individual or relative flow rates of one or both of the positive and negative pressure air streams.

In some examples, adjustment of the positive pressure air flow and/or the return air flow may be optimized for specific operations of the system. Several different techniques are presently contemplated for such adjustment and may include, for example, a bypass valve, a louver, or other mechanical device which may be adjusted to limit the flow of air from the suction filter and, consequently, the intake of air into the blower 22 from the ambient surroundings. Such adjustment may advantageously allow for relative mass or volumetric flow rates of the positive pressure and return airstreams to enhance creation of the air region and extraction of workspace air 204. For example, user inputs may be provided via an operator interface to control one or both adjustments, communicated to the control circuitry 26 to regulate their operation (e.g., via small adjustment motors and/or actuator assemblies). In some examples, adjustments to flow rates for the positive and negative pressure airstreams may be made by altering the speed of one or more motors and/or blowers, fans or compressors. Moreover, other and additional components and functionalities may be built into the system.

As shown in the illustration of FIG. 1, adjustments to the extraction system 10 may alter an amount of workspace air drawn into the extraction system 10. For example, a smaller region 202 represents an approximate limit for the effective capture and extraction of airborne components at a first extraction setting, while a larger region 204 represents a much greater effective capture and extraction region at a second extraction setting. While the effectiveness of the extraction will depend upon factors such as particle size, temperature, flow rate, etc., the graphic illustration of FIG. 1 provides a demonstration of adjustable extraction capabilities.

In the illustration of FIG. 1, the example system 10 is housed in a cart 40 designed to be rolled on wheels or casters 43 to the vicinity of a metal working operation. The system 10 can be designed to be plugged into a conventional outlet, such as to draw power from the power grid. In some examples, the conduits 18 include flexible joints, allowing raising, lowering, lateral and other positioning of the hood 20 at or near, typically above, the work space 14. In some examples, an arrangement of conduits may make use of a manifold to aide in distributing positive pressure air flow to the annular space between the inner and outer shrouds of the hood.

As mentioned above, the present techniques may be employed in systems and arrangements other than carts or systems and base units that are local to a work location. In some examples, fixed or semi-fixed extraction systems may be employed in workshops, factories, assembly and metal-working plants, and so forth.

The conduits 18 convey both a positive pressure or outgoing flow and a return flow that may contain airborne components to be extracted from the work area. In this example, the conduits 18 are adapted for rotation at one or more interfaces. The conduits 18 may rotate more or less than 360 degrees at each interface, although full multi-rotation capabilities may be designed into one or more joints between the conduits 18, the hood 20, and/or the base unit 16. In the embodiment of FIG. 1, the conduit 18 has a lower joint 42 where it joins the base unit, a middle joint 44 that joins two generally linear sections of conduit and a hood joint 46 about which the hood 20 may be pivoted at least within a limited angular range. One or more support structures 48 are provided adjacent to the lower joint 42 or joint 44 to aid in supporting the arm as it is extended toward and/or retracted from a work area. In the example system 10 of FIG. 1, the joints may include smooth inner walls that can be deformed so as to permit extension, retraction and, more generally, positioning of the conduits 18 with respect to the base unit 16, while adding little or no head loss as compared to a linear section of conduit.

As shown in FIG. 1, the base unit 16 has a filter or filter element 38 disposed in a filter box or enclosure 36. The filter enclosure 36 defines a region around or adjacent to the filter 38 from which air is drawn during operation of the system 10. That is, as disclosed herein, the returning or negative airstream enters the base unit 16, and this airstream, bearing the airborne components (e.g., debris, particles, etc.) enters into the region and then through an outer periphery of the filter 38. In some examples, the filter 38 is cylinder-like, but any suitable configuration may be used. In some examples, the filter 38 is hollow, and is closed by a cap. Because debris may be released from the filter element during cleaning, a collection tray 28 is placed near a bottom region of the base unit 16 to allow the debris to be collected and/or separated from the filter 38.

Within the cart, return flow air 12 enters the filter enclosure 36 containing the filter 38, where the air 12 is filtered to remove particulate matter and other components borne by the airstream. The assembly may be designed for pressure cleaning, in a process that may direct pressurized air against one or more filter elements to promote the release of the captured particulate. From the filter enclosure 36, air is drawn into the blower 22 which is driven by motor 24 as described above. In some examples, multiple motors and/or blowers may be employed. For example, one motor and blower set may be used for the outgoing or positive air stream, while another motor and blower set may be used for the return or negative air stream. One or both air streams may be filtered by a common filter or dedicated filters.

The system 10 may be equipped for filtering of components and debris from the air stream 12 returning to the base unit 16. For example, this debris may collect in one or more filters 38 and/or the filter enclosure 36. Moreover, in an additional or alternative example, the collected debris may be cleared or cleaned from the filter elements 38, such as by application of pressurized air (or other fluid), typically in pulses or puffs against the filter medium, as disclosed herein. In a location over which the filter 38 would be placed are nozzle(s) or diffuser(s) 34, which may provide streams, pulses, puffs, and/or other flow of air, gas, and/or other fluids to clean the filter media 38. The nozzle 34 is coupled to a supply conduit 32, which is used to convey compressed air from an air compressor 30 to provide the puffs of forced air to the nozzle 34 for cleaning the filter 38.

In response to this cleaning operation, debris may fall within the filter enclosure 36. One or more collection trays and/or baffles, which may be removable, can be provided below the filter area to capture and/or provide disposal of debris from the environment. In some examples, a filter tray 62 may be arranged as a baffle, plate, or drawer within or below the filter enclosure 36 at which the debris may collect, and/or fall through (e.g., onto a collection tray 28). The collection tray 28 may similarly include one or more baffles to provide separation of the debris from the low pressure that will be present immediately around the filter element 38 when operation of the base unit 16 resumes. From time to time, the debris may be cleaned from the unit 16 by removable of filter tray 62 and/or the collection tray 28.

In some examples, debris may collect on the filter 38, which will occasionally require removal, cleaning, and/or replacement. The debris is often difficult to contain, making disposal efforts complicated and messy affairs. Thus, in some examples, a flexible container is employed to enclose the filter prior to removal and/or disposal, reducing or eliminating the spread of debris. In some examples, the filter enclosure 36 includes a removable tray or other device to allow for removal of debris that collects at a bottom portion of the filter enclosure 36. Such a tray is contemplated for use on each example filter enclosure, yet may be omitted from the figures for simplicity.

Figure 2A:
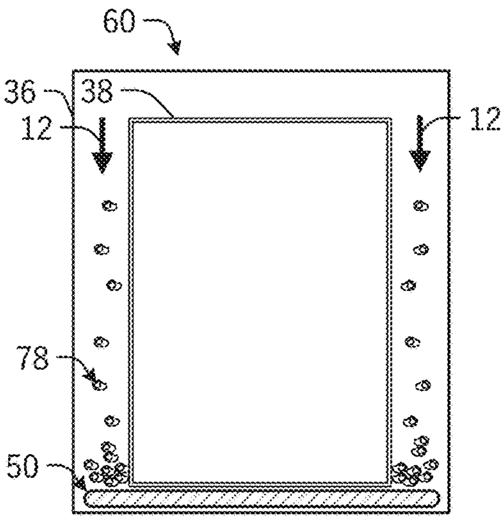
FIGS. 2A to 2D are diagrammatical representations of an example filter removal systems, in accordance with aspects of this disclosure.
Figure 2B:
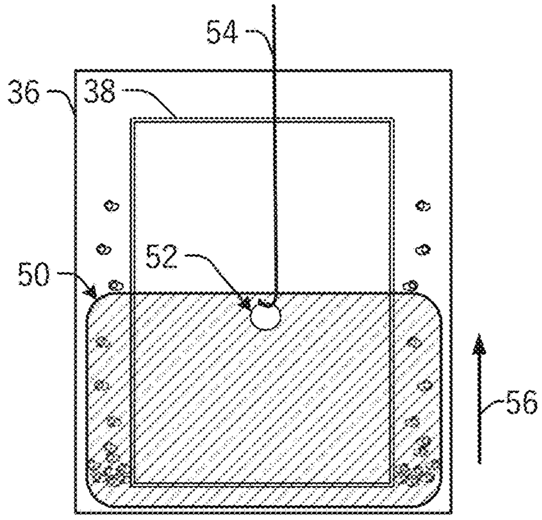

Turning to FIGS. 2A to 2D, a filter enclosure 36 contains a filter 38, which can be deposited and/or removed via opening 60. Return air 12 brings debris 78 into the volume of the filter enclosure 36, which may collect on a filter wall and/or at a bottom of the filter enclosure 36. As disclosed herein, a flexible container 50 is arranged at the bottom of the filter enclosure 36 between the filter 36 and the filter enclosure 36. As shown in FIG. 2A, debris 78 collects on a portion of the flexible container 50 during an airborne extraction operation. In some examples, the flexible container 50 includes a fastener, magnet, hole, slot or other feature 52 from which a portion of the flexible container 50 may be extended to enclose the filter 38. As shown, a tool 54 is used to mate with fastener 52 to hold and raise the flexible container 50 in direction 56, while in some examples a mechanical or other device is incorporated with the filter enclosure 36 to automatically raise the flexible container.

Figure 2C:
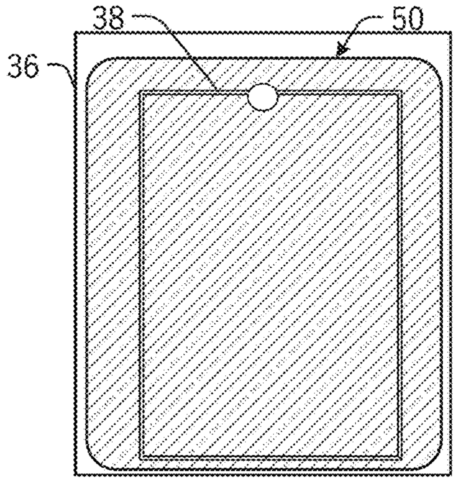

Once the flexible container 50 fully encloses the filter 38, as shown in FIG. 2C, the enclosed filter 38 can be removed from the filter enclosure 36 in direction 58, as shown in FIG.

Figure 2D:
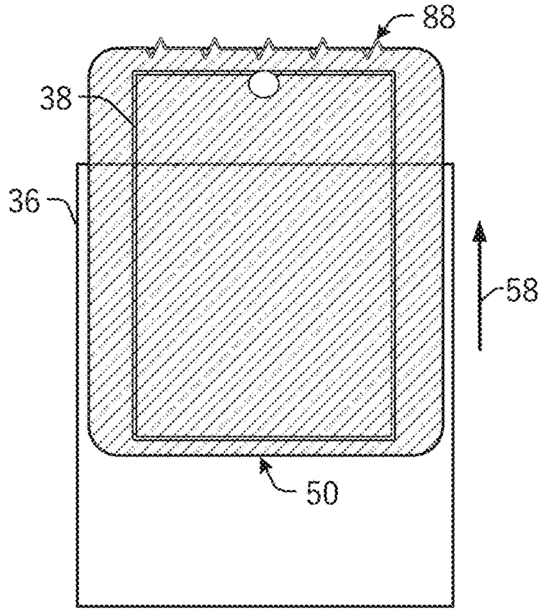

2D. Further, once the flexible container 50 fully encloses the filter 38, the flexible container may be closed by a seal 88 (e.g., a zipper, a clamp, a heat seal, etc.), as shown in FIG. 2D.

In some examples, the flexible container 50 is a bag comprising a durable yet flexible material, such as a polymer, silicon, composite, as a non-limiting list of examples. The flexible container 50 may be housed in a sacrificial package, which may protect the flexible container 50 during an airborne evacuation operation. Thus, to initiate a disposal operation, the sacrificial package may be opened, broken, punctured, or otherwise removed to expose the flexible container within. In some examples, the sacrificial package may comprise a gasket to secure the package below the filter 38 and hold edges of the flexible container at corners of the filter enclosure. The sacrificial package may further include tabs or extensions to make the fastener 52 accessible for removal. In some examples, the sacrificial package and/or gasket may be part of the filter enclosure, configured to release a stored flexible container for disposal, then to accept a new flexible container after disposal.

Figure 3A:
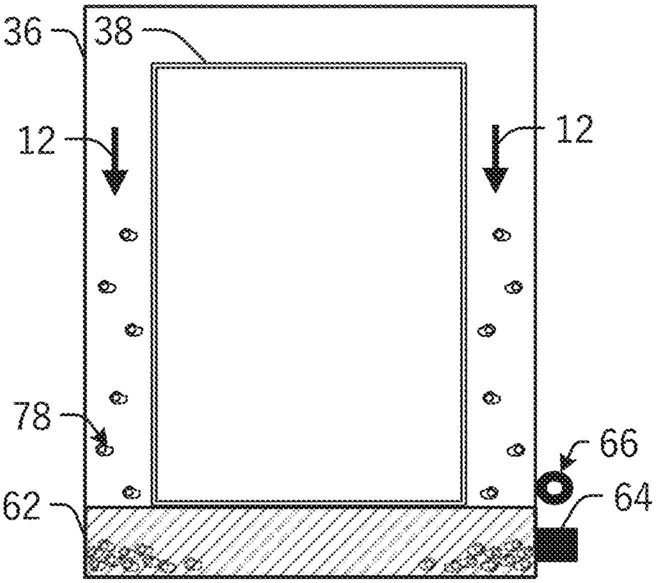
FIGS. 3A and 3B are diagrammatical representations of an example debris removal systems, in accordance with aspects of this disclosure.
Figure 3B:
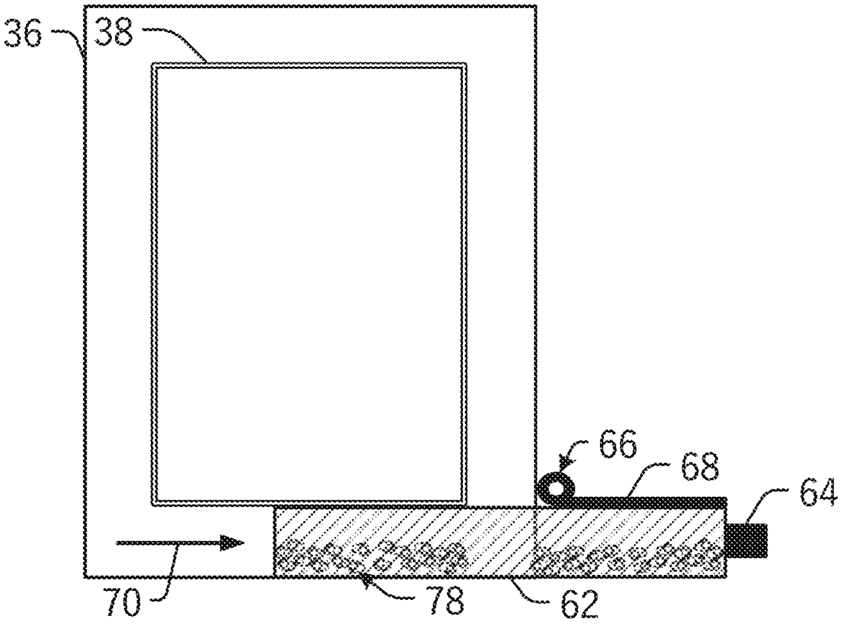

FIGS. 3A and 3B illustrate another example debris disposal system employing removable trays 62. As shown in FIG. 3A, the tray 62 is arranged below the filter 38 to collect airborne debris 78. A handle, spring loaded release, or other suitable mechanism 64 is configured for easy handling and/or removal of the tray 62. In some examples, a film or other cover 66 is arranged at the opening, such as in a roll. As shown in FIG. 3B, as the tray 62 (and debris 78 contained therein) is removed from the filter enclosure 36 in the direction 70, the film 66 is rolled onto a portion of the tray 62 to form a seal 68 to prevent debris from being released into the environment during a disposal operation. In some examples, the tray 62 is made of a durable material (e.g., metal, plastic, etc.) for repeated use. In some examples, the tray 62 is formed of a disposable material (e.g., cardboard, wood, plastic, etc.) that may be discarded and replaced by another tray.

Figure 4A:
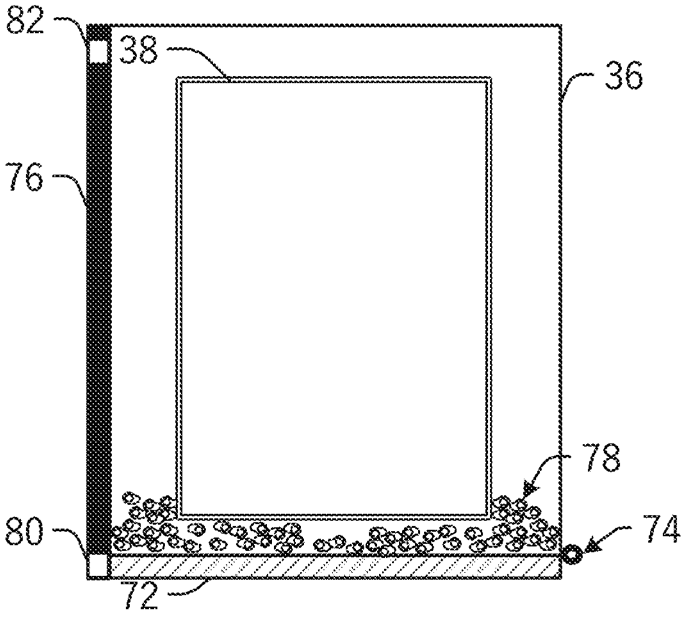
FIGS. 4A and 4B are diagrammatical representations of another example debris removal systems, in accordance with aspects of this disclosure.
Figure 4B:
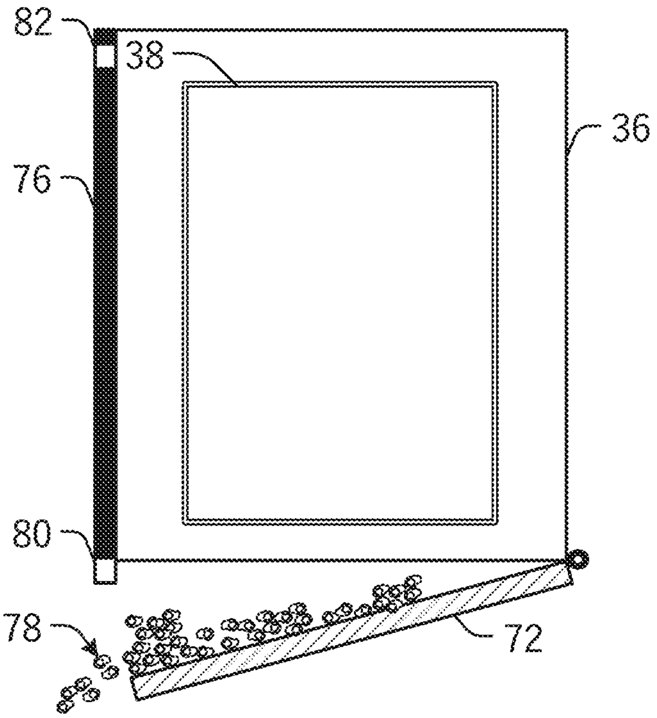

FIGS. 4A and 4B illustrate another example debris removal system such that one or more of the filter enclosure 36, the filter element 38, and/or another container includes a removable or partially removable panel 72. As shown in FIG. 4A, a release mechanism 76 may include a trigger 82 and a closure, clasp, or pin 80 configured to hold the panel 72 in a closed configuration during an airborne extraction operation. Upon activation of the trigger 82 (e.g., from an operator), the panel 72 is configured to pivot about hinge 74 to open and release debris 78, as shown in FIG. 4B. In some examples, the opening provided by release of the panel 72 may provide access to the filter 38 for removal, replacement, and/or cleaning.

Figure 5C:
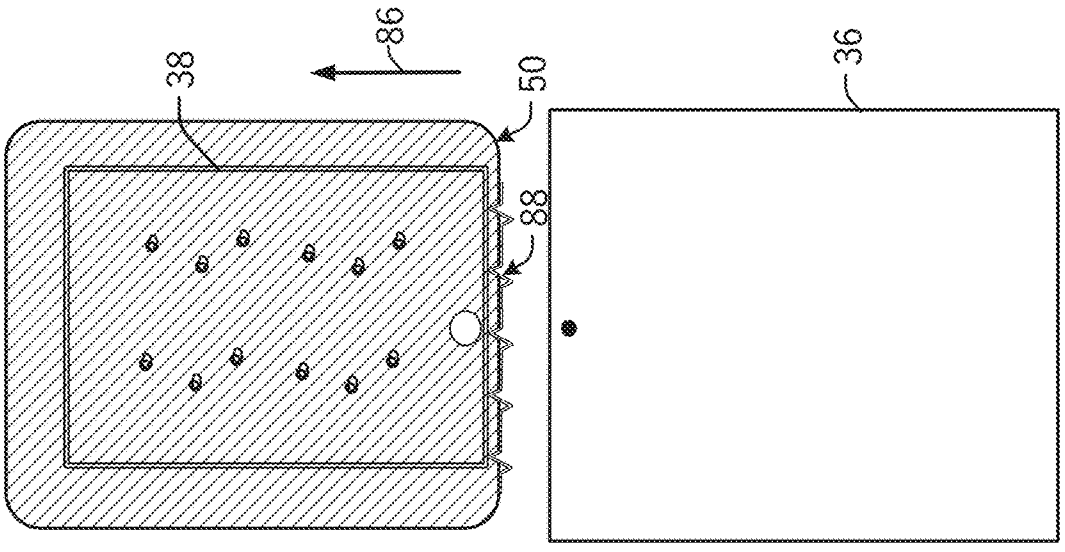
FIGS. 5A to 5C are diagrammatical representations of another example filter removal systems, in accordance with aspects of this disclosure.
Figure 5B:
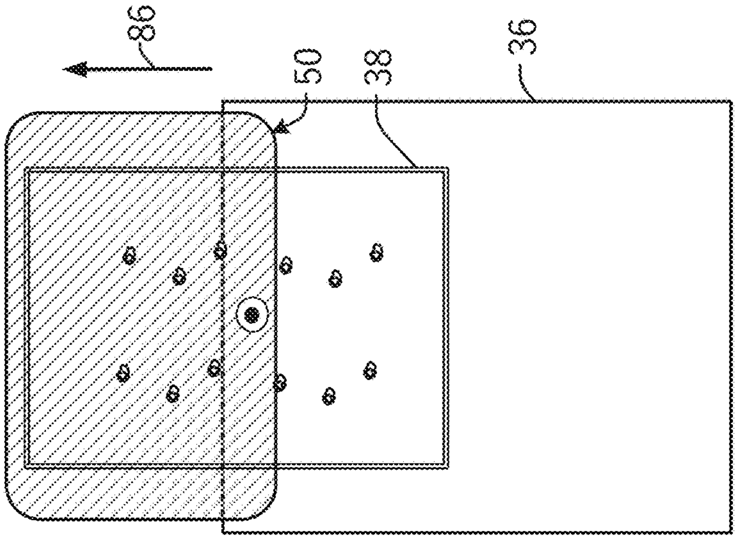
Figure 5A:
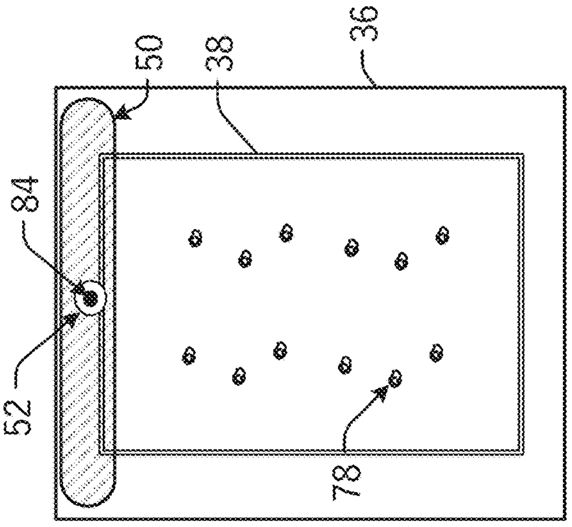

FIGS. 5A to 5C illustrate another example filter removal systems employing a flexible container 50. In the example of FIG. 5A, the flexible container 50 is secured at the opening 60 of the filter enclosure 36 by use of a magnet, fastener, hole, pin, or other fixturing 84 to mate with fastener 52. In some examples, a magnetic fastener 52 is attracted to a metallic wall of the filter enclosure 36. In some examples, the flexible container 50 is fastened directly to the filter element prior to removal. As the filter 38 is removed, the flexible container 50 encloses the filter 38 as it is removed from the filter enclosure 36 in direction 86, as shown in FIG. 5B. Once the enclosed filter 38 is removed from the filter enclosure 36, a seal 88 can close the flexible container 50 to prevent debris from being released into the environment during a disposal operation.

In some examples, the filter 38 may include one or more handles, bars, or other device 37. The handles 37 may be configured to be exposed for removal of the filter element during a disposal operation. For instance, the handles allow for manipulation (by an operator, robot, tool, etc.) through one or more surfaces of the flexible container 50 to aid in removal of the filter 37.

Figure 6C:
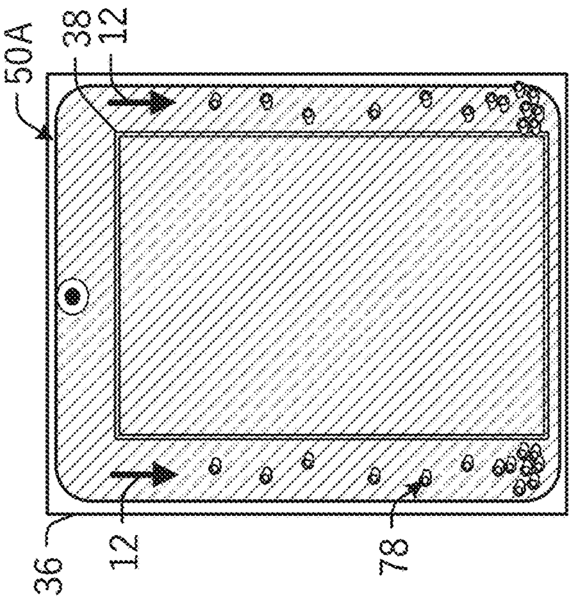
FIGS. 6A to 6C are diagrammatical representations of yet another example filter removal systems, in accordance with aspects of this disclosure.
Figure 6B:
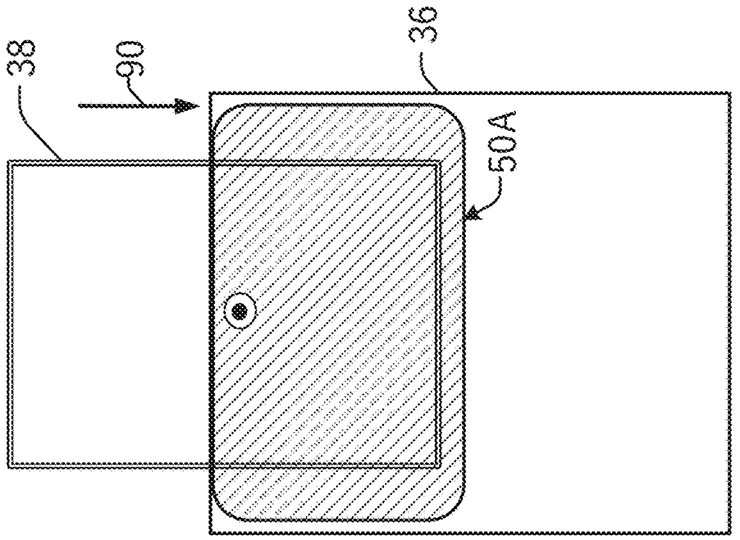
Figure 6A:
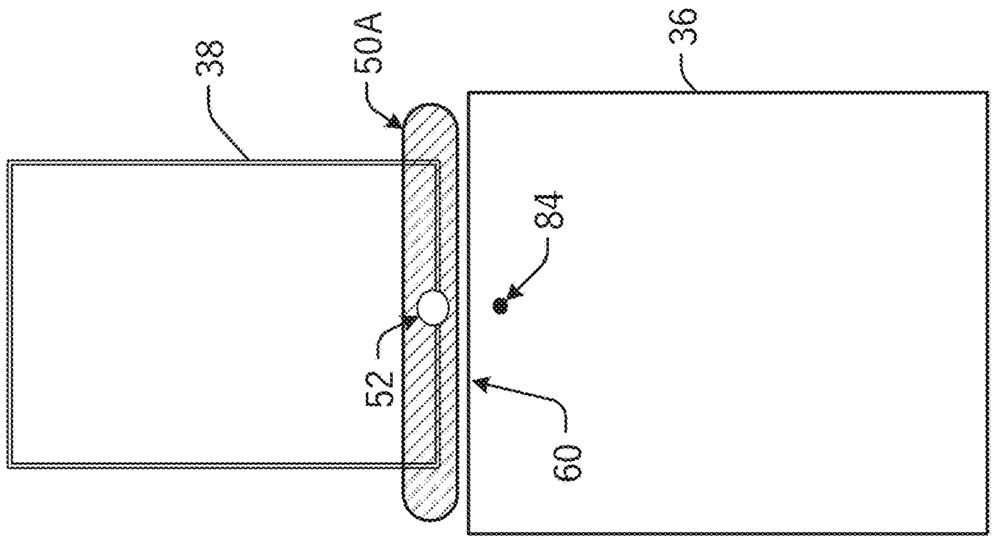

FIGS. 6A to 6C illustrate yet another example filter removal systems employing a flexible container 50A. In the example of FIG. 6A, a semi-porous flexible container 50A is arranged at opening 60 of the filter enclosure 36. As the filter 38 is inserted into the filter enclosure 36 in direction 90 shown in FIG. 6B, a portion of the semi-porous flexible container 50A is secured to a portion of the filter enclosure 36 at the opening 60 (e.g., as fastener 52 and fastener 84 mate). As a result, the semi-porous flexible container 50A expands and/or unrolls to surround the filter 38 in preparation for an airborne extraction operation. For disposal of the filter 38, the semi-porous flexible container 50A can be released from the fastener 84 and sealed at the top portion (e.g., at the opening 60), such that the enclosed filter 38 is removed in its entirety.

Figure 7A:
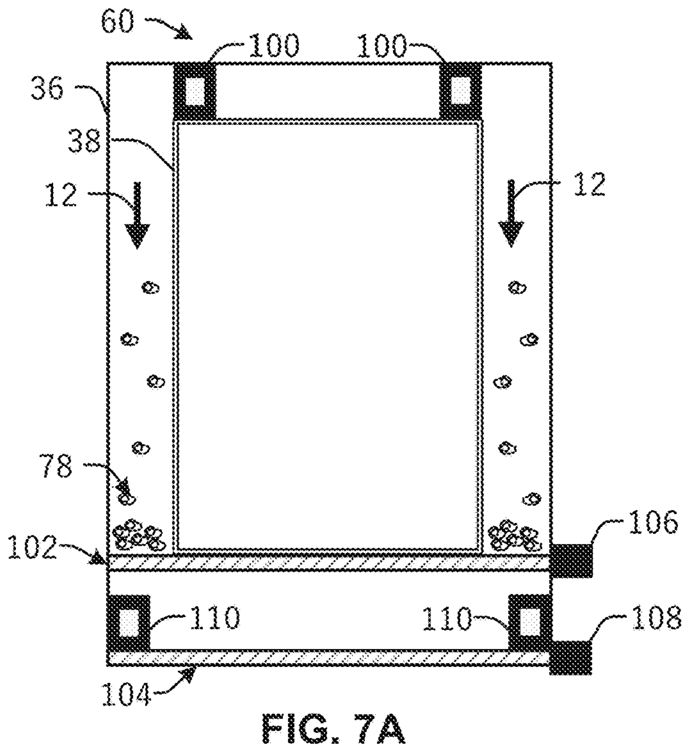
FIGS. 7A to 7D are diagrammatical representations of yet another example filter removal systems, in accordance with aspects of this disclosure.

FIGS. 7A TO 7D are diagrammatical representations of yet another example filter removal systems employing a removable base opposite the opening 60 of the filter enclosure 36, making the interior of the filter enclosure 36 accessible through the removable base. As shown, a first movable panel 102 and a second movable panel 104 enclose a space containing fasteners 110 for a flexible container 50B. As shown in FIG. 7A, debris 78 falls onto a surface of the panel 102 during an extraction operation.

Figure 7B:
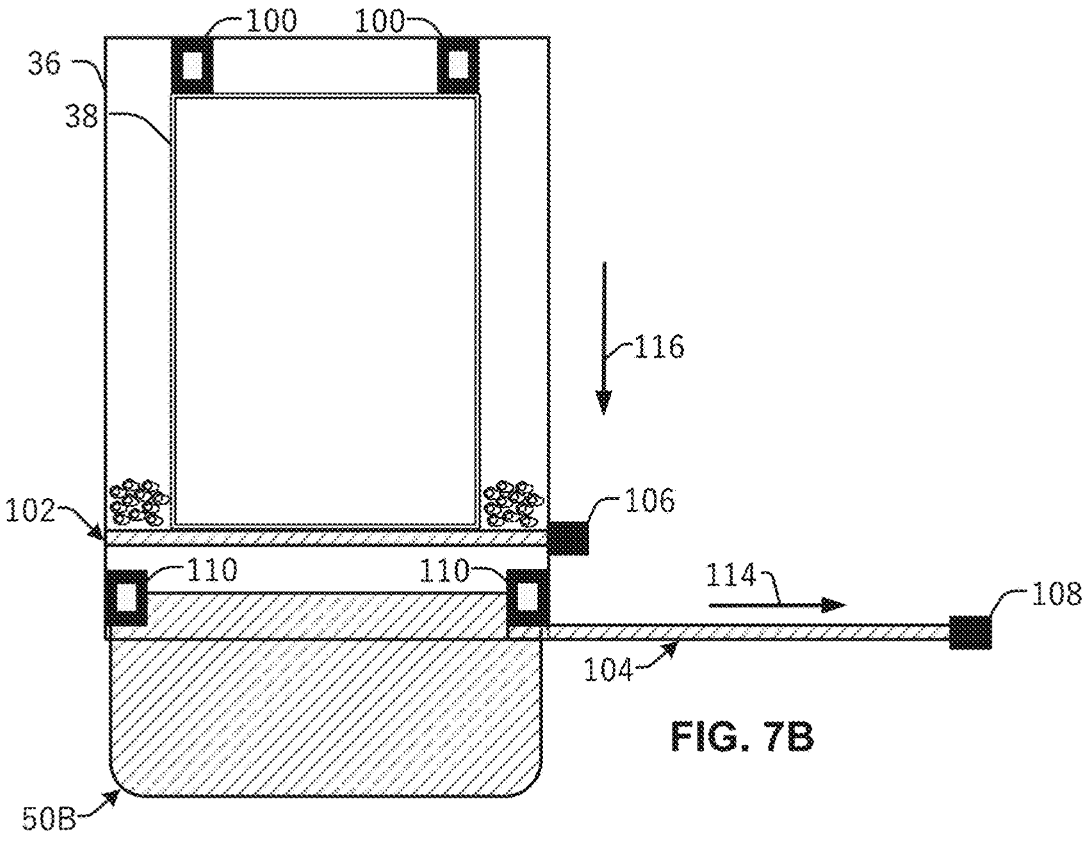
Figure 7C:
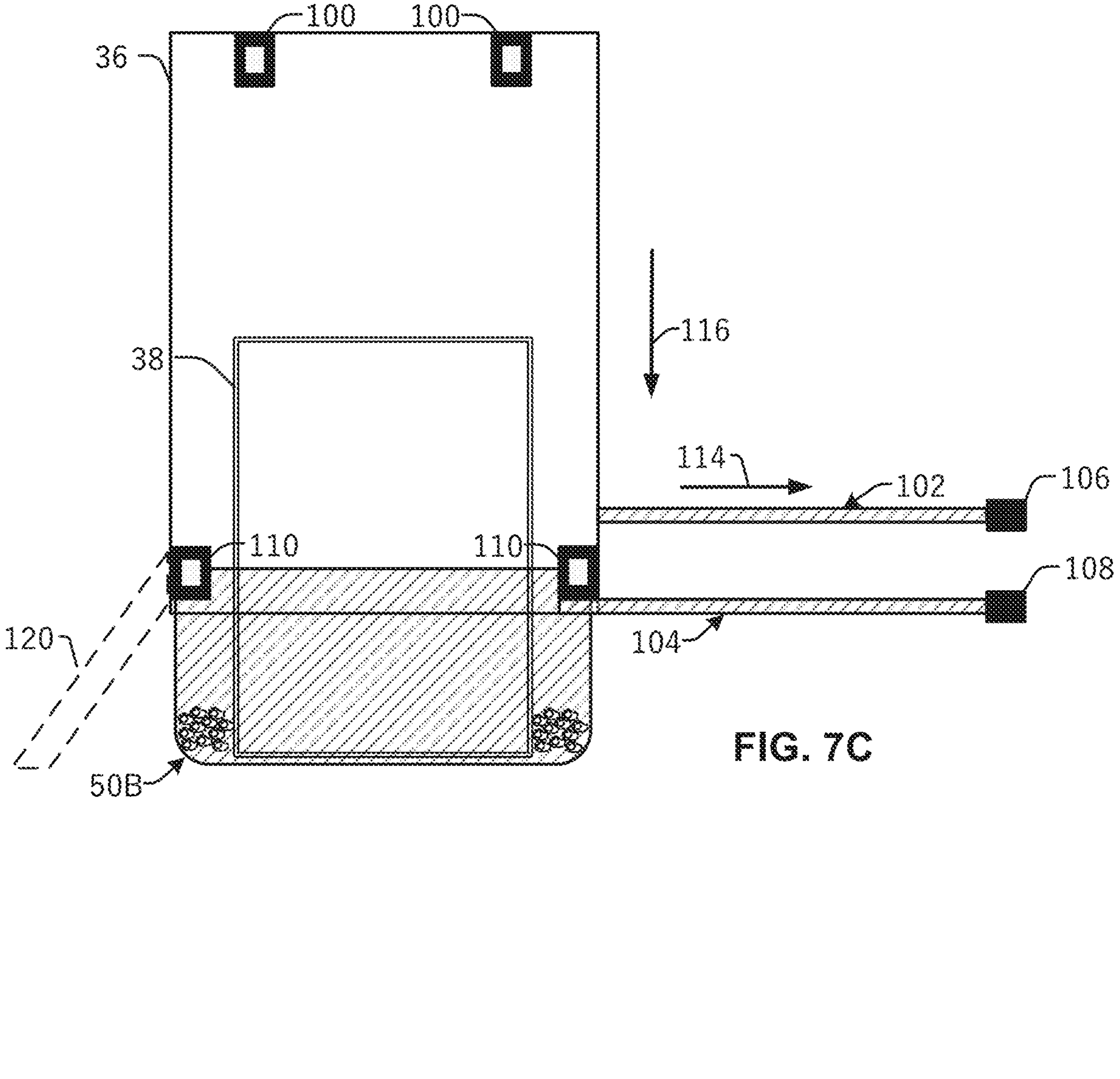

To initiate a filter and/or debris removal operation, panel 104 is removed by sliding in direction 114, as shown in FIG. 7B. The panel 104 may be pulled manually by a handle 108 or may be automatically moved (e.g., by use of a motor). The flexible container 50B can be secured to fasteners 110 to hold the container 50B in place and to hold it open. FIG. 7C illustrates the panel 102 being moved in direction 114 (by pulling handle 106), thereby allowing the debris and filter 38 to fall in direction 116 into the flexible container 50B. The filter 38 can be secured to fasteners 100 during extraction operations, and released from the fasteners 100 during a filter removal operation.

In some examples, an evacuation tool 120 may be employed (e.g., via an opening or other attachment) to remove remaining debris during and/or after filter removal.

Figure 7D:
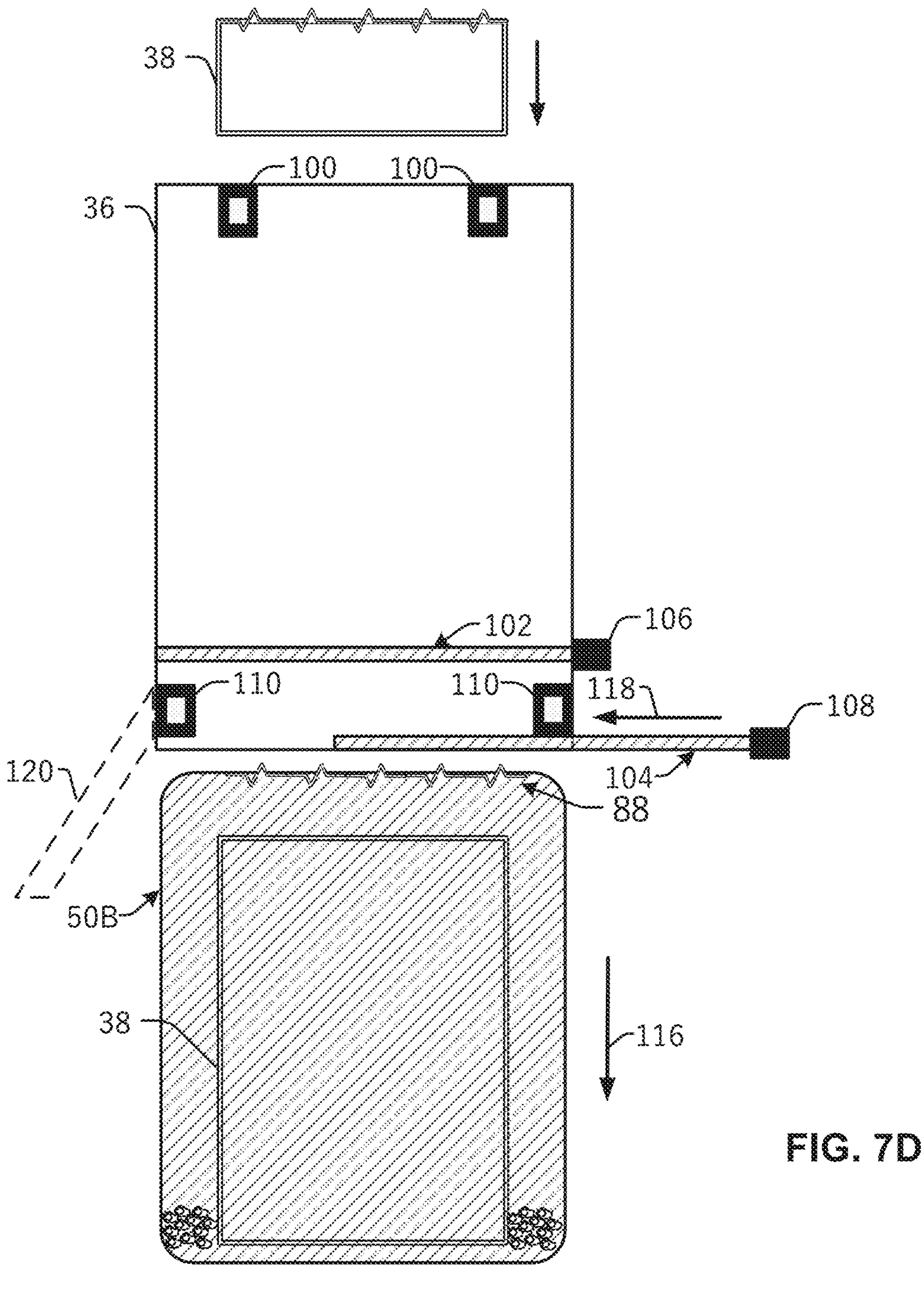

As shown in FIG. 7D, the once filter 38 is in place within the flexible container 50B, the flexible container 50B can be removed from fasteners 110. A cinch, zip, seal, and/or other closure device 88 may be used to prevent debris 78 entering the atmosphere. Panels 102 and/or 104 can be put back in place by moving them in direction 118, and a new filter 38 can be inserted into the filter enclosure 36 (secured in place by fasteners 100).

Based on sensor or other data, the control circuitry may determine a value of the one or more operating conditions and compare the value to a list of threshold operating condition values. If the operating condition value exceeds a first or given threshold operating condition value (e.g., provided in a listing of threshold operating condition values, such as stored in a memory associated with the control circuitry 22), the control circuitry is configured to control the valve to open to convey pressurized air to initiate a cleaning operation.

Figure 8:
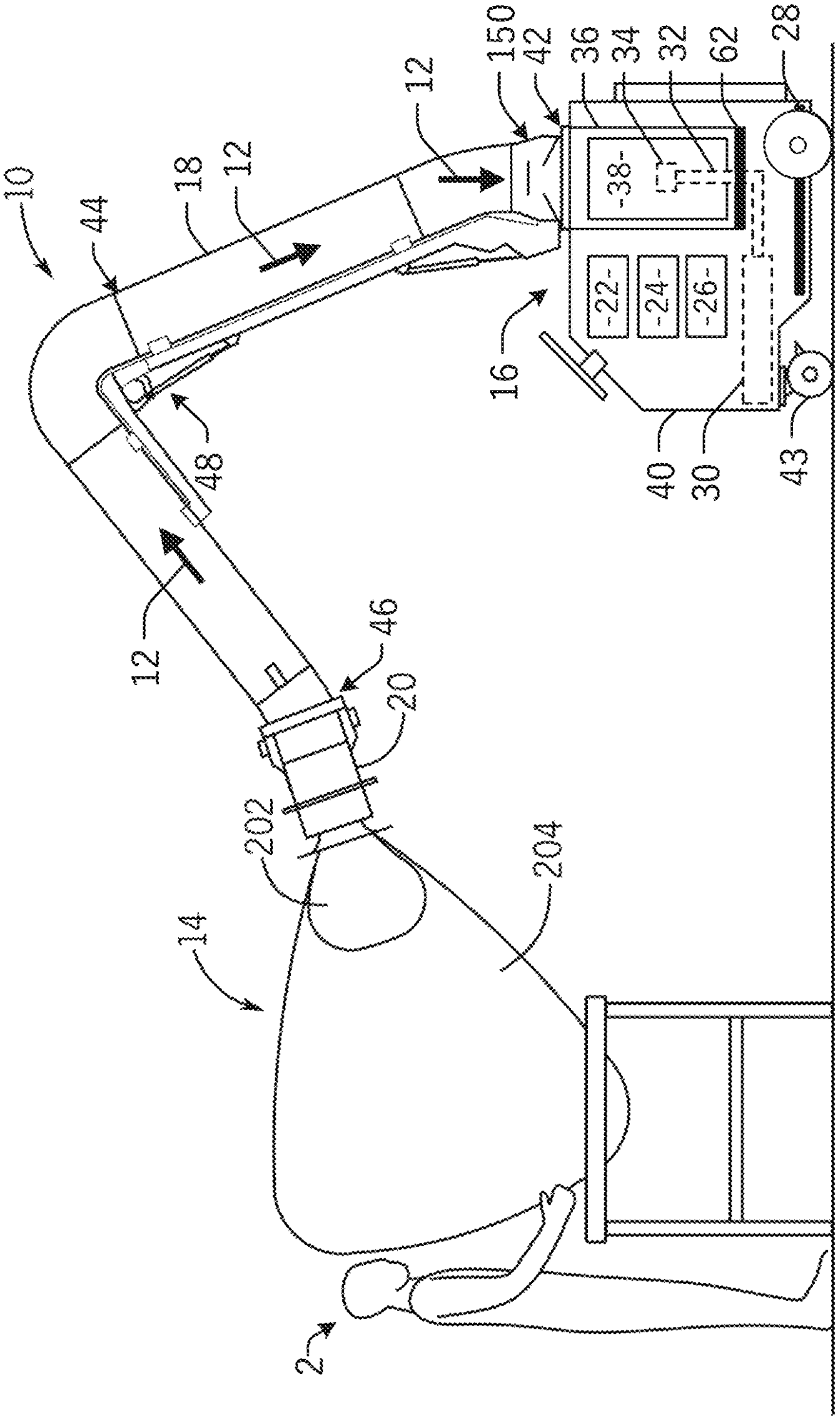
FIG. 8 illustrates an example fume extractor that includes a cooling system and a filter removal system, in accordance with aspects of this disclosure.
Figure 9:
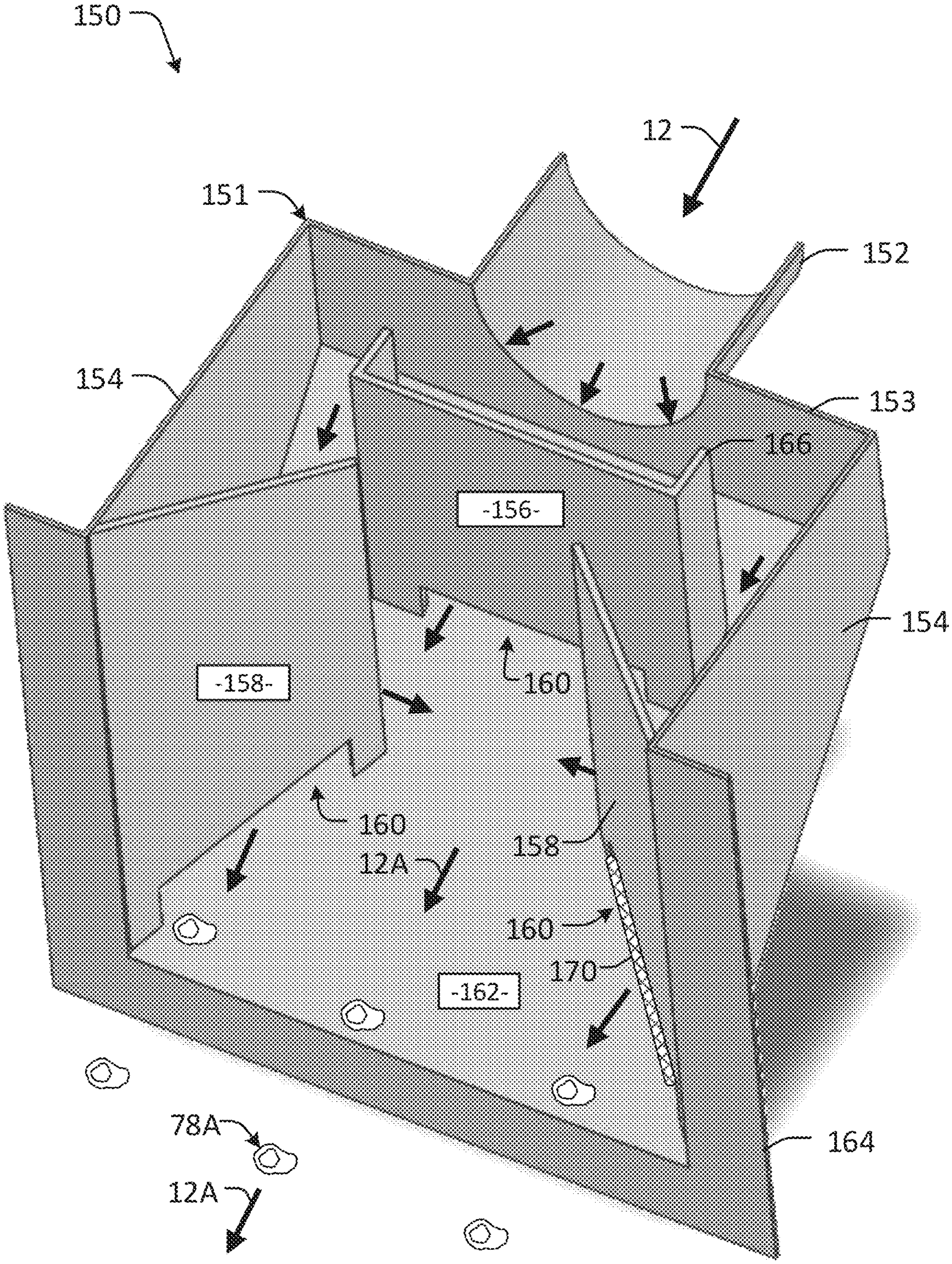
FIG. 9 provides a cross-sectional view of the cooling system of FIG. 8, in accordance with aspects of this disclosure.

Turning to FIGS. 8 and 9, a cooling system 150 for cooling sparks that may collect in debris and/or be introduced into an extraction system 10. As shown in FIG. 8, the cooling system 150 is arranged upstream of the filter 38 (and may be arranged upstream of the filter enclosure 36). The cooling system 150 may include one or more conduits and/or manifolds, which may be provide support through which the conduit 18 is attached to the housing 40. Air 12 is drawn into the conduit 18 from the work area and is slowed upon reaching the cooling system 150 prior to exposure to the filter 38. For example, the cooling system 150 provides a tortuous path through which air and/or debris flows, thereby increasing the time and/or distance debris (including heated and/or sparking particulate matter) travels to reach the filter 38.

FIG. 9 provides a cross-sectional view of the cooling system 150. As shown, an inlet or conduit 152 allows air 12 to enter the housing or manifold 151. The manifold 151 includes one or more top walls 153, side walls 154 or 162, and/or bottom plates 164. In some examples, the conduit 152 is configures to mate with conduit 18, thereby creating a substantially airtight path for air 12. The bottom plate 164 may include one or more fasteners or other mounting equipment for securing the cooling system 150 to the housing 40, or may be welding to the housing. Although illustrated as having a substantially rectangular geometry, the manifold 151 and/or any constituent part may include any type and/or types of geometry. For example, the manifold 151 may be circular, triangular, oval, as a list of non-limiting examples, and the constituent parts may conform to the manifold geometry.

As shown, one or more perpendicular plates 156 is arranged within the manifold 151 to meet the airflow from conduit 152. Having met resistance from the perpendicular plate 156, the air 12 is diverted to the internal surface of the walls, etc., of the manifold 151, and/or through one or more slots 160 (which allows for some particulate matter to fall through). As the air 12 flows toward the base plate 164, in some examples, it will meet a surface of one or more secondary plates 158, further slowing the flow of the air. As shown, the secondary plates 158 are orientated at an angle relative to the direction of airflow through the manifold 151 (e.g., approximately 45 degrees, and/or less or more than 45 degrees).

In some examples, the secondary plates 158 include additional slots 160, whereas in other examples the secondary plates 158 and/or the perpendicular plate(s) 156 do not include slots 160. In some examples, the slots 160 are openings formed, cut, drilled, or otherwise created in the plates 156, 158. In some examples, a grate or other filter 170 is arranged at, near, or with one or more of the slots 160. The filter 170 may be removable and/or have a different opening size and/or material composition (e.g., metal, ceramic, etc.) to suit a particular application.

Together the plates 156, 158 and/or slots 160 create a tortuous path for the flow of air to yield cooled air 12A and/or cooled particulate debris 78A. As the manifold 151 of the cooling system 150 is angled downward, shown in the example of FIG. 9, and the plates have slots, particulate matter that collects is allowed to fall and slide into the enclosure 36, to be removed by one or more of the disposal techniques disclosed herein, including removal by way of tray 62. In this way, the cooling system 150 is self-cleaning.

Although illustrated with a relative size, shape, and/or arrangement, the plates may be modified to create and/or divert one or more tortuous paths that vary in size and flow pattern. The system may be scaled for different ducting sizes (e.g., larger or smaller systems, high or low pressure, etc.). Further, although three plates are shown in FIG. 9, additional plates may be employed to further increase the spark cooling effect and further frustrate the flow or air.

The disclosed cooling system 150 provides advantages over other systems. For example, the perpendicular plate 152 and/or secondary plates 154 allow for collected debris to fall into the enclosure 36 for removal without requiring access to the manifold interior and/or removal of the system. Further, in the example of FIG. 9, the manifold 151 is arranged above the enclosure 36, thereby allowing cooled and collected debris 78A to fall naturally into the enclosure 36. In some examples, the system is arranged to a side or at an angle to the enclosure 36, depending on variations on different applications.

In some examples, original equipment or even retrofits for the disclosed filter disposal system may be made to equipment such as shop vacuum systems, existing evacuation installations, and so forth. It is also contemplated that structures and teachings based on those set forth herein may be employed in specific settings to provide enhanced airborne component collection.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A filter disposal system for an airborne extractor system comprising:

a flexible container configured to enclose a filter element, the flexible container being defined by a first configuration corresponding to an airborne extraction operation and the flexible container further being defined by a second configuration corresponding to a disposal operation; and a filter enclosure including an opening configured to receive and house at least a portion of the filter element in a filter-housing area of the filter enclosure, wherein the flexible container is arranged between the filter-housing area of the filter enclosure and a periphery the filter enclosure in the first configuration, and the flexible container covers the filter-housing area of the filter enclosure in the second configuration, wherein the flexible container being stored at an end of the filter enclosure opposite the opening, when the flexible container is in the first configuration during an airborne extraction operation.

2. The system of claim 1, wherein the flexible container includes one or more fasteners to attach the flexible container to the filter enclosure.

3. The system of claim 2, wherein the one or more fasteners include one or more of a magnet, a screw, or a hook.

4. The system of claim 1, wherein the flexible container is stored in a sealed package configured to be opened at initiation of the disposal operation.

5. The system of claim 4, wherein the filter element is configured to be removed through the opening during a disposal operation, the flexible container configured to be removed from the sealed package, and to enclose the filter element as the flexible container is drawn from the end of the filter enclosure toward the opening.

6. The system of claim 5, wherein the flexible container further comprises a seal to close the filter element within the flexible container in the second configuration.

7. A filter disposal system for an airborne extractor system comprising:

a flexible container configured to enclose a filter element, the flexible container being defined by a first configuration corresponding to an airborne extraction operation and the flexible container further being defined by a second configuration corresponding to a disposal operation; and a filter enclosure configured to house at least a portion of the filter element in a filter-housing area, wherein the flexible container is arranged between the filter-housing area, of the filter enclosure and a periphery of the filter enclosure in the first configuration and covers the filter-housing area of the filter enclosure in second configuration, wherein the flexible container is configured to expand to enclose the filter element as the filter element is removed from the filter enclosure, wherein the flexible container is stored in a sealed package configured to be opened at initiation of the disposal operation.

8. The system of claim 7, wherein the flexible container comprises an air-tight, flexible material.

9. The system of claim 7, wherein the flexible container is configured to be sealed to enclose the filter element in the second configuration as the filter element is removed from the filter enclosure.

10. The system of claim 7, wherein the filter enclosure is configured to permit removal of the filter element through an opening in the filter enclosure during a disposal operation, the flexible container configured to be removed from the sealed package, and to enclose the filter element as the flexible container is drawn from an end of the filter enclosure toward the opening.

11. The system of claim 10, wherein the flexible container further comprises a seal configured to close the filter element within the flexible container in the second configuration.

12. The system of claim 7, wherein the filter enclosure is configured to receive the filter element through an opening of the filter enclosure, the flexible container being stored at an end of the filter enclosure opposite the opening when the filter enclosure is in the first configuration during an airborne extraction operation.

* * * * *